United States Patent [19]

Hambrecht et al.

[11] Patent Number: 4,914,167
[45] Date of Patent: Apr. 3, 1990

[54] POLYMERIC ORGANIC ACIDS, THEIR PREPARATION AND THEIR USE IN DETERGENTS AND CLEANSERS

[75] Inventors: Juergen Hambrecht, Heidelberg; Heinrich Hartmann, Limburgerhof; Walter Denzinger, Speyer; Albert Hettche, Hessheim; Wolfgang Trieselt, Ludwigshafen; Rolf Schneider, Mannheim, all of Fed. Rep. of Germany

[73] Assignee: BASF Aktiengesellschaft, Ludwigshafen, Fed. Rep. of Germany

[21] Appl. No.: 752,013

[22] Filed: Jul. 8, 1985

Related U.S. Application Data

[63] Continuation of Ser. No. 425,699, Sep. 28, 1982, abandoned.

[30] Foreign Application Priority Data

Oct. 10, 1981 [DE] Fed. Rep. of Germany ....... 3140383

[51] Int. Cl.$^4$ ............................ C08F 6/02; C08F 2/02
[52] U.S. Cl. ...................................... 526/65
[58] Field of Search ................................. 526/317, 65

[56] References Cited

U.S. PATENT DOCUMENTS

| | | | |
|---|---|---|---|
| 3,308,067 | 3/1967 | Diehl | 252/161 |
| 3,475,398 | 10/1969 | Jobard | 260/92.8 |
| 3,635,915 | 1/1972 | Sale | 526/271 |
| 3,755,264 | 8/1973 | Testa | 260/78.5 |
| 3,837,481 | 9/1974 | Stungis et al. | 209/4 |
| 4,042,768 | 8/1977 | Muller et al. | 526/65 |
| 4,196,272 | 4/1980 | Goretta et al. | 526/317 |
| 4,248,990 | 2/1981 | Pilski et al. | 526/317 |
| 4,267,365 | 5/1981 | Findersen | 526/317 |
| 4,328,327 | 5/1982 | Tanako et al. | 526/66 |
| 4,390,670 | 2/1981 | Walivsky | 526/271 |
| 4,390,672 | 6/1983 | von Bonin | 526/271 |
| 4,414,370 | 11/1983 | Hamillec | 526/88 |

FOREIGN PATENT DOCUMENTS

540101 11/1931 Fed. Rep. of Germany .
1092844 11/1967 United Kingdom .
1547048 6/1979 United Kingdom .

OTHER PUBLICATIONS

Fundamental Principles of Polymerization, Wiley & Sons, 1962, p. 195.
Peter Berth et al, "Phosphate und Phosphatsubstitute fuer Waschmittel", Chemiker-Zeitung, 1971, Nr. 12.

*Primary Examiner*—Joseph L. Schofer
*Assistant Examiner*—Peter F. Kulkosky
*Attorney, Agent, or Firm*—Oblon, Spivak, McClelland, Maier & Neustadt

[57] ABSTRACT

Organic polyacids are prepared from monomeric monofunctional acids, such as acrylic acid or methacrylic acid and monomers without an acid group, with or without dicarboxylic acids or their anhydrides, by continuous free radical mass copolymerization under superatmospheric pressure at from 200° to 400° C., followed, if desired, by neutralization of the polyacids obtained. The polyacids obtained by the novel process are useful as phosphate substitutes and scale inhibitors in detergents and cleansers.

10 Claims, No Drawings

POLYMERIC ORGANIC ACIDS, THEIR PREPARATION AND THEIR USE IN DETERGENTS AND CLEANSERS

This application is a continuation of application Ser. No. 425,699, filed Sept. 28, 1982 now abandoned.

The present invention relates to polymeric organic water-soluble acids (hereafter referred to as polyacids) which are prepared by continuous mass copolymerization of ethylenically unsaturated monocarboxylic acids, with or without dicarboxylic acids or their anhydrides, and other copolymerizable monomers.

The invention also relates to the use of these continuously produced polyacids as builders and scale inhibitors in detergents and cleansers.

Polyacids based on polymaleic anhydride, and corresponding copolymers, have been described many times in the literature, and their use as assistants in detergent formulations has also been disclosed.

German Patent 540,101 describes maleic anhydride copolymers with various comonomers, eg. styrene, α-methylstyrene, coumarone and vinyl acetate. They are prepared batchwise by mass polymerization or solution polymerization in the presence of free radical initiators. Nothing is disclosed concerning the moleoular weight of the resulting polymers, nor any clear statement made concerning their use. The disadvantage of the polymers obtained by this prior art process is that they are chemically and physically heterogeneous. Hence, aqueous or alkali-neutralized solutions of these polymers are frequently inhomogeneous. Moreover, the said monomer compositions do not give products which conform to the requirements made of detergent assistants, for example scale inhibitors.

Maleic anhydride copolymers with small proportions of comonomers, eg. acrylic acid, vinyl acetate etc., are disclosed in U.S. Pat. No. 3,755,264. The polymerization, which again is carried out batchwise, in toluene and in the presence of large amounts of initiators, gives polymers with molecular weights of from $3.10^2$ to $10^5$. These polymers again suffer from the disadvantage that because of the batchwise operation physically and chemically heterogeneous copolymers result. This is particularly true of maleic anhydride copolymers, since, for many monomers, the copolymerization parameters are very unfavorable (cf. Ullmanns Encylopädie der technischen Chemie, Verlag Chemie, Weinheim, 4th edition, Volume 19, pages 151 et seq. (1980)). Accordingly, the copolymers have very differing maleic anhydride contents, depending on the comonomer. A further disadvantage is that the solvent employed in the preparation of the copolymers must be removed after the polymerization, and reprocessed for re-use, and in the detergent sector in particular residual solvent in the polymer is objectionable and must be removed laboriously.

Finally, U.S. Pat. No. 3,837,481 discloses polyacids which are essentially synthesized from maleic anhydride and minor proportions of acrylic acid, and additional comonomers such as vinyl acetate. The polymerization is again carried out batchwise. The reaction medium is water and the initiator is potassium persulfate. The resulting molecular weights are from $5.10^2$ to $3.10^4$. The fields of use mentioned are detergents, inter alia in the washing powder industry. The main disadvantage of these polyacids is that during polymerization maleic anhydride is hydrolyzed to maleic acid and this makes the copolymerization parameters even more disadvantageous (cf. Ullmanns Encyclopädie der technischen Chemie, Verlag Chemie, Weinheim, 4th edition (1980), Volume 19, page 151 et seq.). Accordingly, the polymers obtained are chemically and physically very heterogeneous which affects, inter alia, the effectiveness of detergent combinations produced from these polymers.

With the polymers prepared by the processes described in the above publications, it has moreover been found that the yields and purity of the products were poor. This applies especially to the process described in U.S. Pat. No.3,755,264. Here we found, on repeating the procedure, that after polymerization and hydrolysis the main product was monomeric maleic aoid. An article by Berth in Chemiker-Zeitung 95,550–551 mentions, amongst other polyelectrolytes, polymaleic acid (cf. Table, bottom of page 550) and the author considers that the washing power of detergents containing this product, or the other polyelectrolytes mentioned, is far less than that of phosphate-containing detergents.

It is an object of the present invention to provide a simple, preferably one-step, process for the preparation of polyacids which guarantees good yields and pure end products. It is a further object of the invention to obtain, by such a process, products which give improved results in the detergent field, ie. they should not only provide good calcium-binding capacity—which is only one of several requirements which builders have to meet—but also help solve the scale problem resulting from the omission of phosphates. It is a further object to provide products which have a useful white wash action matching that of phosphates. It is yet a further object to provide polyacids which are chemically and physically very homogeneous and whose preparation can be carried out reproducibly.

We have found that these objects are achieved by an improved free radical-initiated continuous mass polymerization as specified in claims 1 to 3 and by the products defined in claim 4.

We have found that the polyacids having the structure according to the invention and prepared by the process according to the invention have K values of from 18 to 33, determined by the method of DIN 53,726 in 2% strength dimethyl formamide solutions, are chemically and physically very homogeneous and surprisingly act, in low-phosphate detergents, as excellent scale inhibitors and builders having both a good calcium-binding capacity and good detergent action. They thus exhibit important features which have hitherto only been shown by phosphates.

Suitable monofunctional organic acids of monomer group (a) are those of 3 to 10 carbon atoms, preferably acrylic acid, methacrylic acid, crotonic acid, vinyllactic acid, vinylsulfonic acid and vinylphosphonic acid. Acrylic acid and methacrylic acid are particularly preferred. The monomers of group (a) can be employed alone or as mixtures with one another. Examples of mixtures are acrylic acid and methacrylic acid, or acrylic acid and vinylphosphonic acid. The monomers of group (a) contribute from 50 to b 99% by weight, preferably from 60 to 85% by weight, of the structure of the polymers. The proportion of these monomers in the monomer mixture corresponds to the proportion of such monomer units in the copolymer. The percentages referred to above, and in the text which follows, are based on the sum of all monomers or monomer units.

Copolymerizable monomers of group (b) are all monomers which are copolymerizable with the monomers of group (a) and, where present, of group (c). Examples include styrene, α-methylstyrene, esters of acrylic acid or methacrylic acid with monohydric or polyhydric alcohols, preferably with monohydric $C_1$–$C_{10}$–alkanols, monoesters and diesters of maleic acid with $C_1$–$C_{10}$–alcohols, α-olefins, eg. diisobutene, dodecene and octadecene, lllyl alcohol, vinyl acetate, vinyl alkyl ethers and vinylpyrrolidone. Particularly preferred monomers of group (b) are vinyl acetate, n-butyl acrylate, 2-ethylhexyl acrylate, hydroxypropyl acrylate, styrene, N-vinylpyrrolidone and vinyl isobutyl ether.

The polymer contains from 0.5 to 5% by weight, preferably from 1 to 5% by weight, of the monomers (b).

Monomers of group (c) are maleic anhydride, maleic acid, fumaric acid and itaconic acid. The use of the first-mentioned is particularly preferred, since it facilitates the copolymerization. The polymer contains from 0 to 49% by weight, preferably from 1 to 40% by weight, of monomer units of group (c).

The free radical initiators used are organic peroxides and azo compounds which have decomposition characteristics to suit the required polymerization temperature. Examples include dialkyl peroxides, eg. di-tert.-butyl peroxide, dicumyl peroxide, monoalkyl hydroperoxides eg. tert.-butyl hydroperoxide, per-acid esters, eg. tert.-butyl peroctoate, tert.-butyl perpivalate, tert.-butyl peracetate and tert.-butyl perbenzoate, peroxide, eg. lauroyl peroxide and benzoyl peroxide, percarbonates, eg. tert.-butyl peroxyisopropylcarbonate, and azo compounds, eg . azo-bis-isobutyronitrile. Particularly preferred initiators are tert.-butyl peroctoate, tert.-butyl perbenzoate, di-tert.-butyl peroxide and azo-bis-isobutyronitrile. They are used in the polymerization in amounts of from 0.1 to 5% by weight, preferably from O.3 to 1% by weight.

As regards the continuous polymerization process required to prepare the novel copolymers, the following is to be noted:

The polymerization apparatus used can be, for example, a pressure kettle, a pressure kettle cascade, a pressure tube or a pressure kettle with downstream reaction tube equipped with a static mixer. Preferably, the monomers (a), (b) and, if used, (c) are polymerized in two or more polymerization zones arranged in series. One reaction zone can consist of a pressure-resistant kettle and the other of a pressure resistant reaction tube, preferably a heated static mixer. If the polymerization is carried out in two zones connected in series, conversions of above 99% can be achieved. During polymerization, the components must be mixed thoroughly, for example by the use of pressure-resistant kettles equipped with a stirrer, or of polymerization tubes equipped with a static mixer.

The copolymerization is carried out continuously. For example, a copolymer of acrylic acid, maleic anhydride and n-butyl acrylate can be prepared by feeding the monomers continuously to a reactor or to two polymerization zones arranged in series, for example a pressure kettle cascade, and discharging the product continuously from the reaction zone after a residence time of from 2 to 60, preferably from 5 to 3O, minutes at from 200° to 400° C., preferably from 280° to 400°° C. It is important to adhere to these temperature limits since, if the temperature is too low, the residence time is too long and the molecular weight too high, whilst if the temperature is too high thermal decomposition can occur. The space-time yields are in general from 1 to 50 kg of polymer per liter per hour.

The polymerization is carried out under superatmospheric pressures of >1 bar, preferably of from 1 to 200 bar. Particularly good results are achieved if the polymerization reaction is carried out with periodic pressure fluctuations corresponding to pressure differences of from 5 to 120 bar and thereafter the pressure is let down under similar pressure fluctuation conditions. These measures result in a pulsing flow of the reaction mixture which causes self-purging of the reactor and prevents wall crusts and caking, which would be detrimental to the product obtained. The product discharged is homogeneous and does not contain any specks or cracked material.

. Continuous polymerization for the purposes of the present invention is also intended to include a procedure in which first about 10% of the monomer mixture is introduced into a polymerization zone, for example a kettle and thereafter the remainder of the monomer mixture is run in continuously over from 30 to 300 minutes. In this procedure, however, the space-time yields are not as high as with continuous polymerization in two reaction zones connected in series.

In contrast to the known processes, the polymerization is carried out in the absence of a solvent.

The solids content of the polymers prepared by the continuous process is above 99% and in preferred embodiments above 99.5%. To remove the residual volatile constituents, which as a rule are unconverted monomers, the polymer can be devolatilized under reduced pressure. For this, conventional vaporization apparatus, such as tube evaporators, plate evaporators or film extruders are employed. As a rule, such devolatilization is however not necessary for the preparation of the novel polymers.

The copolymer can be discharged from the polymerization apparatus either continuously, for example via a let-down vessel with downstream discharge unit, or preferably under pulsing conditions. For many applications it is advantageous to employ the copolymer in a hydrolyzed, neutralized or partially neutralized form. In these cases, following the polymerization, carboxylic anhydride groups in the copolymer are therefore hydrolyzed in water and/or carboxyl groups are 50–100% neutralized with bases. Examples of suitable bases are gaseous ammonia, aqueous ammonia solutions or aqueous solutions of other bases, such as NaOH, KOH, alkaline earth metal hydroxides, eg. $Mg(OH)_2$ or $Ca(OH)_2$, amines, eg. tri-$C$-$C_4$--alkylamides, hydroxyalkylamines, eg. monoethanolamine, diethanolamine, triethanolamine, monoisopropanolamine, diisopropanolamine or triisopropanolamine, and mixtures of such amines.

The procedure followed in hydrolysis or neutralization is as a rule to prepare copolymer solutions having a solids content of from 20 to 50% by weight. The aqueous, partially or completely neutralized solutions can readily be diluted further by addition of water. However, the hydrolysis or neutralization of the copolymers can also be carried out continuously directly following the copolymerization. In that case, the hot polymer melt issuing from the reactor is reacted continuously with water or the bases mentioned, at from 8O° to 200° C. under a pressure of above 1 bar, using residence times of from 10 to 90 minutes. Examples of suitable apparatus for hydrolysis and neutralization are pressure kettles, pressure tubes, which may contain built-in mixing devices, and combinations of pressure kettles and pressure tubes. Preferably, combinations of pressure tubes, at least some of which are equipped with mixing devices, are employed. These mixing devices may be rods or screen plates. Preferred mixing devices are those which, whilst offering very little resistance to the flow of the reaction mass, divide the latter into a plurality of streams and then recombine these, accompanied by a change in flow direction. Static mixers are examples of such mixing devices.

The polyacids according to the invention, and their aqueous solutions, which may or may not be neutralized, are excellent scale inhibitors. Their effect is in many cases so good that they even give lower ash contents of washed fabrics than do phosphates, eg. pentasodium triphosphate, which constitute up to 40 per cent by weight, or even more, of conventional detergents.

Further, we have found that the novel polyacids have a high calcium-binding capacity and a useful white wash action, ie. they also act as typical builders.

The novel polyacids and their salts can beaadded to the detergents in varying amounts, depending on the end use. If they serve as scale inhibitors, they are generally present in amounts of from 1 to 6 per cent by weight, preferably from 0.5 to 5 per cent by weight, based on solids, if they serve as phosphate substitutes, they may be present in amounts of up to 40 per cent by weight.

The Examples illustrate the preparation and use of the products prepared according to the invention. Parts and percentages are by weight; the K values were determined in 2% strength solution in DMF, according to DIN 53,726.

EXAMPLES

Preparation of the polyacids of Examples 1–6

The amounts of acrylic acid, maleic anhydride and n-butyl acrylate, methyl acrylate, vinyl acetate or tert.-butyl vinyl ether shown in Table 1 were fed continuously, together with tert.-butyl perbenzoate, through a pressure regulator into a pressure kettle (capacity 1,OOO parts) having a downstream pressure tube of twice the capacity. The system was heated to 285° C. and the pressure was kept at from 5 to 50 bar and varied within this range once a minute by a periodic pressure regulator device. The residence time was from 10 to 30 minutes and the copolymer melt was discharged in an amount equal to that of the fresh monomer mixture introduced. The cppolymers obtained had the K values shown in Table 1.

TABLE 1

| Example | Starting materials (parts by weight) | | | Initiator (parts by weight) | K value |
|---|---|---|---|---|---|
| | (a) | (b) | (c) | | |
| 1 | 70 AAc | 28 MAn | 2 BA | 0.5 TBPB | 27 |
| 2 | 60 AAc | 36 MAn | 4 BA | 0.5 TBPB | 32 |
| 3 | 80 AAc | 18 MAn | 2 MA | 0.5 TBPB | 33 |
| 4 | 50 AAc | 48 MAn | 2 MA | 0.5 TBPB | 16 |
| 5 | 90 AAc | 8 MAn | 2 VAc | 0.5 TBPO | 32 |
| 6 | 50 AAc | 48 MAn | 2 Vi4 | 0.5 TBPO | 18 |
| 7 | 70 AAc | 28 MAn | 2 MA | 0.5 TBPB | 33 |

AAc = acrylic acid
MAn = maleic anhydride
BA = n-butyl acrylate
MA = methyl acrylate
VAc = vinyl acetate
Vi4 = vinyl isobutyl ether
TBPB = tert.-butyl perbenzoate
TBPO = tert.-butyl peroctoate

Comparative Experiment

Polyacrylic acid was prepared by the conventional methods of polymerization in aqueous solution—containing 35% by weight of acrylic acid—at 100° C. in the presence of 0.5% by weight, based on monomeric acrylic acid, of hydrogen peroxide. The K value, measured on a 1% strength solution in water, was 40. The ash contents shown in Tables 2 and 3 were found with this polyacrylic acid.

The novel compounds were tested as scale inhibitors in detergents by the following method:

Pieces of fabric (10 g of cotton nettle No. 222 or cotton toweling) are washed 20 times in a Launder-O-meter from Atlas. The water hardness was 22° German hardness, the liquor ratio was 12.5:1 and the detergent concentration was 8 g/l. A phosphate-reduced detergent was used, with or without 2%—based on detergent—of the test substance. In the detergent employed, the builder comprised 3% of sodium carbonate, 7.5% of Na silicate and 19% of phosphates, including 11% of sodium tripolyphosphate and 7% of sodium orthophosphate. The detergent therefore conformed to Level 2 of the Maximum Phosphate Content Order under the West German Detergent Law.

After the 20 washes, the fabric pieces were ashed and the scale formation quoted in 1% of the original fabric weight.

Table 2 shows the ash contents found, in comparison to those found with a commercial scale inhibitor and without inhibitor, under boil-wash conditions (45 minutes at 40°–95° C.).

Table 3 shows the scale formation obtained using the compounds according to the invention in a 60° wash (45 minutes at 40°–60° C.), again in comparison with washes using a commerical inhibitor and using no inhibitor.

It will be seen that in all cases the novel compounds reduce the ash content of the fabric, after 20 washes, to a greater or at least equally great extent as that achieved with the commerical scale inhibitor.

TABLE 2

| Example/ | % Ash | |
|---|---|---|
| Comparative Example | Cotton 222 | Toweling |
| 1 | 2.5 | 4.6 |
| 2 | 2.5 | 4.4 |
| 3 | 2.4 | 4.7 |
| 4 | 2.6 | 4.6 |
| 5 | 2.7 | 4.5 |
| 6 | 2.5 | 4.4 |
| 7 | 2.5 | 4.4 |
| Comparative Example | 3.2 | 4.8 |
| washed without scale inhibitor | 4.1 | 8.4 |

TABLE 3

| | % Ash | |
|---|---|---|
| Example | Cotton 222 | Toweling |
| 1 | 1.6 | 3.6 |
| 3 | 1.6 | 3.7 |
| 4 | 1.5 | 3.5 |
| 7 | 1.6 | 3.4 |
| Comparative Example | 2.3 | 4.1 |
| washed without scale inhibitor | 2.8 | 6.7 |

We claim:

1. A continuous process for the preparation of a water-soluble organic acid copolymer, having a K value between 18–33, which exhibits scale inhibiting properties when used in low phosphate detergents and calcium-binding capability and detergent action when used as a builder comprising the following steps:

A. copolymerizing in two polymerization zones arranged in series a comonomeric mixture consisting essentially of:
   (1) 60–85% by weight of acrylic acid, methacrylic acid or combinations thereof,
   (2) 1–5% by weight of at least one monomer devoid of acid groups being copolymerizable with monomer (1) selected from the group consisting of vinyl acetate, n-butyl acrylate, 2-ethylhexyl acrylate, hydroxypropyl acrylate, styrene, N-vinylpyrrolidone, vinylisobutyl ether and mixtures thereof, and
   (3) 10–40% by weight of maleic anhydride, the total of components (1), (2) and (3) being 100%,
   under continuous mass polymerization conditions with thorough mixing of the components in the absence of a solvent in the presence of from 0.1–5% by weight, based on the total amount of monomer components, of a free radical initiator at a temperature of from 200°–400° C. for 5 to 30 minutes and at a superatmospheric pressure ranging from 1 to 200 bar, thereby producing the molten copolymer;

B. discharging said molten copolymer from the reactor, while simultaneously introducing into the reactor said comonomeric mixture, wherein the amount of said molten copolymer discharged from said reactor at any time is equal to the amount of said comonomeric mixture simultaneously introduced into the polymerization medium in said polymerization zones;

C. at least partially neutralizing said discharged copolymer; and

D. recovering said at least partially neutralized, water-soluble organic acid polymer having a K value between 18–33.

2. The process of claim 1, wherein said free radical initiator is a dialkyl peroxide, a monoalkyl hydroperoxide, a per-acid ester, or an azo compound.

3. The process of claim 1, wherein the copolymerization reaction is conducted over a period of time of 2–60 minutes.

4. The process of claim 1, wherein the temperature of copolymerization ranges from 280°–400° C.

5. The process of claim 1, wherein one polymerization zone consists of a pressure-resistant kettle and another polymerization zone consists of a pressure-resistant reaction tube.

6. The process of claim 5, wherein said pressure-resistant reaction tube is a heated static mixer.

7. A polymeric organic acid, as such or completely or partially ne realized, prepared by the process of claim 1, and having a K value of from 18–33 as determined in a 2% strength dimethylformamide solution according to the standard industrial procedure DIN 53,726.

8. A detergent and cleanser containing the polymer product of claim 7, as a builder and scale inhibitor.

9. The process of claim 1, wherein, in step C, said discharged copolymer is neutralized rom 50 to 100%.

10. The process of claim 1, wherein, in step A, the monomers which constitute monomer component (2) are n-butyl acrylate, methyl acrylate, vinyl acetate and vinyl isobutyl ether.

* * * * *